Aug. 24, 1954
G. M. ATTURA
2,687,503
MODULATING DEVICE FOR ELECTRIC MOTOR FOLLOW-UP SYSTEMS
Filed Sept. 30, 1949
2 Sheets-Sheet 1
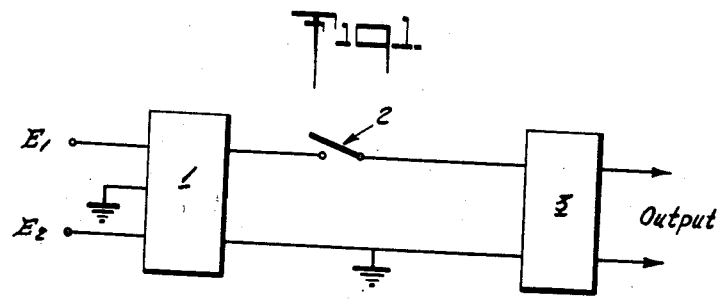
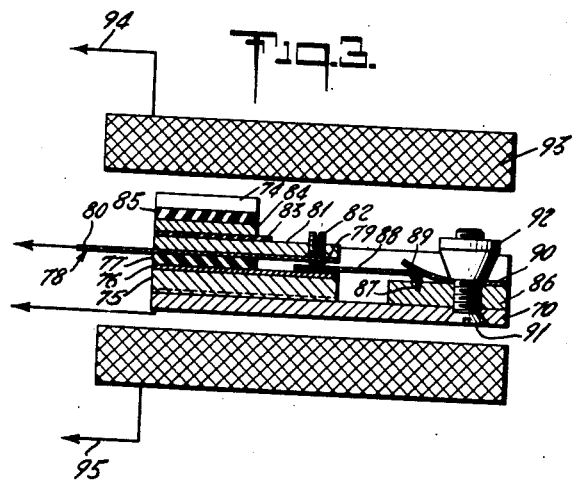
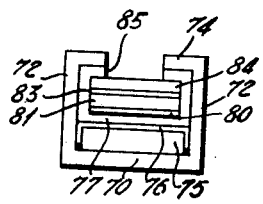
INVENTOR.
George M. Attura
BY
*Bartlett, Eyre, Keel & Weymouth*
ATTORNEYS

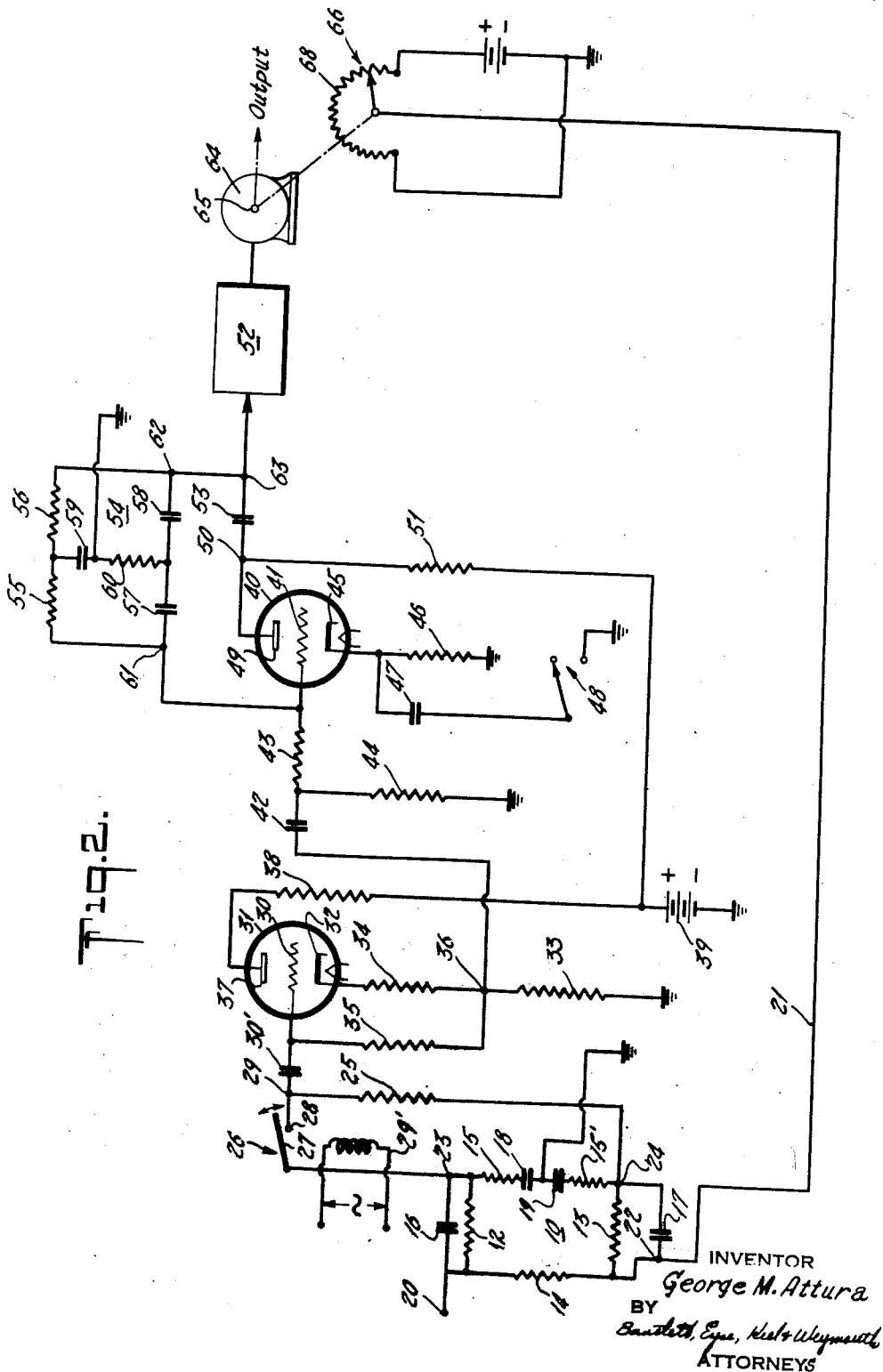

Patented Aug. 24, 1954

2,687,503

UNITED STATES PATENT OFFICE 2,687,503

MODULATING DEVICE FOR ELECTRIC MOTOR FOLLOW-UP SYSTEMS

George M. Attura, Levittown, N. Y., assignor to Servomechanisms, Inc., Mineola, N. Y., a corporation of New York Application September 30, 1949, Serial No. 118,968

4 Claims. (Cl. 318—28)

This invention relates to electronic circuits and more particularly to electronic control circuits of the character used, for example, in electromechanical servo and follow-up systems.

Servo control systems are used to control an output or load device in accordance with a control signal which varies in some predetermined manner. The control signal is usually of small magnitude and one of the purposes of the servo is to respond to changes in the control signal and generate sufficient power to cause a load, an electric motor, for example, to operate in accordance with changes in direction, magnitude and rate of change of the control signal. The requirements of servos of this character are therefore stability, accuracy and dependability. In present day applications such as the coordination of gun sights with radar distance and direction measuring equipment in high speed modern aircraft, servo apparatus must in addition be small and compact, free from vibrational effects and must react rapidly to effect the desired control.

One of the important parts of a servo which governs the attainment of certain of these requirements is the modulator circuit wherein a direct current control signal and a feedback signal produced by the servo itself are brought together, to operate the servo to effect the desired controlling operations.

There are two general classes of modulators with which I am familiar, namely electronic and mechanical. I have found that the former or the electronic method which embodies conventional diode or triode vacuum tubes are subject to drift and therefore do not provide a stable dependable output under adverse operating conditions. The mechanical or vibrator method more generally known as the sampling method, familiar to me utilizes a single pole double throw vibrator which alternately samples the control and feedback signals. It has been found that this system has the inherent disadvantages of unequal sampling of two signals and the formation of a strong harmonic components that are difficult to eliminate. That is the sampling time for each is unequal and in many applications sufficient error is thereby introduced into the system to render it unsatisfactory. For instance in gun control systems for high velocity jet aircraft and the like where the targets are small and the changes in range and direction are extremely fast, the modulator must respond instantly and accurately even in the presence of severe vibration and temperature variations if the servo of which it is part is to perform satisfactorily.

My invention overcomes the aforementioned difficulties encountered with proposed electronic and mechanical modulation methods and provides a simple, stable and compact unit for producing an alternating error signal from the direct current control and feedback voltages; and one that is relatively free from undesirable harmonics.

Another object of the invention is a modulator wherein balance controls and adjustments are entirely eliminated.

Still another object is a stable, compact modulator, that may be made on a quantity basis with each unit being readily interchangeable with any other unit.

Another object of the invention is a new and improved method for producing an alternating current error signal for the operation of a servo mechanism.

The above and other objects and advantages of the invention will become more apparent in the following description when taken in connection with the drawings forming part of this application.

In the drawings:

Fig. 1 is a diagrammatic view of one embodiment of the invention;

Fig. 2 is a circuit diagram of a modulator in accordance with the invention;

Fig. 3 is a cross-sectional view of one form of interrupter for use with the circuit shown in Figs. 1 and 2; and Fig. 4 is an end view of the interrupter shown in Fig. 3.

Broadly, my invention in one aspect treats the direct current control and feedback signals in two steps to produce an alternating error signal; that is, the two direct current signals are first compared one with the other to produce an error signal, and then the error signal is periodically interrupted to provide an alternating current signal which includes the information necessary to effect the desired control. The error signal is then amplified and further treated to change its wave form from that of a square wave to that of a sine wave and is then further amplified to develop sufficient power for the operation of the servomotor to be described.

In Fig. 1 I have illustrated in block form a modulator in accordance with the invention. It includes a comparator 1 arranged to receive two direct current signals $E_1$ and $E_2$ of which one is a control voltage and the other a stabilizing or bucking voltage. In the more detailed circuit shown in Fig. 2, this stabilizing voltage is obtained by means of feedback and its operation will be described in detail in connection with that figure.

The comparator 1 delivers an output or error signal in direct current form that represents the difference between voltages $E_1$ and $E_2$ and is proportional to $E_1$ with respect to rate of change and magnitude. The phase of the error signal may be either negative or positive, depending upon the relative values of $E_1$ and $E_2$.

The error signal is then interrupted by a suitable interrupter denoted by the numeral 2 to obtain an interrupted or alternating current signal. This signal may then be amplified by an amplifier 3 capable of delivering the desired power output.

This circuit renders unnecessary balance controls or adjustments which are used in proposed devices with which I am familiar and as I first obtain the error voltage and then interrupt that voltage, undesirable harmonics experienced in the electromechanical sampling method are eliminated, as well as drift problems in the electronic methods referred to above. The harmonics generated by the electromechanical sampling system are very difficult if not impossible to filter out once they are generated and cause appreciable error in the operation of the servo unit.

The invention as illustrated in Fig. 2 embodies a mechanical vibrator for interrupting the error signal produced by a comparator in the form of a differentiating and integrating network for comparing the two direct current signals. It has been found that a mechanical vibrator for single pole single throw operation is extremely stable especially when broadly tuned to the actuating frequency which is ordinarily within the audio-range.

The comparative network I have employed in the illustrated embodiment of the invention is denoted by the numeral 10 and includes five resistors 12-15 inc. and 15' and four capacitors 16 to 19 inc. A control signal for operation of the servo, which for example may be a direct current signal generated by a range measuring device, is connected to the terminal 20 which in turn is connected to a junction of resistor 12 and condenser 16 that are part of the differentiating network. Similarly a stabilizing or feedback signal is conducted by means of the lead 21 and terminal 22 to a junction of resistor 13 and condenser 17. The resistor 14 interconnects the terminals 20 and 22. A pair of condensers 18 and 19 performing an integrating function are connected in series with each other and with resistors 15 and 15' across the junctions 23 and 24, with the junction between condensers 18 and 19 being connected to ground. These condensers may be made adjustable if desired or provided with trimmer condensers to balance the network although I have found that by proper selection of components such adjustments are rendered wholly unnecessary.

The error signal which is the difference between the control and feedback signals and proportional in phase and amplitude to the control signal is developed across the load resistor 25 in series with a chopper or vibrator 26 and connected between junctions 23 and 24 of the network 10. The vibrator or chopper 26 includes a vibrating arm 27 and a cooperating contact 28. The arm is actuated by the electro-magnet 29' energized by a suitable alternating current and alternately opens and closes the circuit through resistor 25 to periodically interrupt the error signal to produce an alternating voltage whose phase is proportional to the polarity of the direct current control signal and whose amplitude is proportional to the magnitude of such signal. When the arm is open a voltage varying with the feedback signal appears at terminal 29 connected to contact 28. When the arm is closed the voltage change at terminal 29 will be that occasioned by the error signal.

Thus by first producing a direct current error signal and then using a single pole single throw chopper, a vibrator or other circuit interrupting means to interrupt the signal, the strong harmonics produced by the electromechanical sampling method by reason of the transit time or period when the arm of a single control double throw vibrator is moving from one contact to the other are completely eliminated. Complicated filters employed in an effort to remove such spurious harmonic signals are of course also eliminated and this together with other features of the invention enable a material reduction in both size and cost of the units. Moreover it has been found that in the voltage sampling systems, the vibrators not only do not have equal sampling times for each voltage, but the variation with time is sufficient to produce objectionable drift and error in the servo unit. This drift also varies from vibrator to vibrator and thus seriously interferes with quantity production of replaceable modulation units. With my invention however I interrupt only the error signal in a simple on-off cycle by use of an arm and one contact and therefore the modulator is independent of the objectionable relay or vibrator effects encountered with proposed systems known to me. Furthermore with my system problems of balancing and vibrator selection problems are completely eliminated and all modulator units are readily interchangeable.

The alternating error signal appearing between the junction 29 and the ground (Fig. 2) possesses a square wave characteristic. This signal is then fed through condenser 30' to the grid 30 of tube 31 connected as a cathode follower. More particularly the cathode 32 of tube 31 is connected to ground through resistors 33 and 34 while the grid is returned through resistor 35 to the junction 36 of resistors 33 and 34, which junction is also one output terminal for the stage. The plate 37 is connected through the plate resistor 38 to the positive side of battery 39 having its negative terminal connected to ground.

The second stage of amplification is performed by the tube 40, the signal being impressed on the grid 41 through a blocking condenser 42 and resistor 43. The resistor 43 together with a resistor 44 connected between the condenser 42 and ground forms a voltage divider to reduce the signal to the grid 41 and provide a grid return path to ground. The cathode 45 is connected to ground through resistor 46 and is bypassed by a condenser 47 connected in series with an on-off switch 48. In this way the gain of the amplifier tube 40 can be modified to obtain the desired output. For instance with switch 48 closed so that condenser 47 shunts resistor 46 the gain of the stage is increased while if switch 48 is in the open position a lower gain will be obtained.

The plate 49 of tube 40 is connected to the positive side of the battery or other power supply 39 through junction 50 and plate resistor 51. The output signal is taken from junction 50 and is fed to another amplifier 52 through a coupling condenser 53.

As previously pointed out, the error signal upon being interrupted periodically by the vibrator or chopper 26 produces a square wave signal. I prefer to modify this wave shape to obtain a sine wave signal and accomplish this by means of a filter feedback network 54 bridging the plate and grid circuits of the tube 40.

The particular filter shown, and one with which I have had particularly good results is known as a double "Wien" bridge and includes a pair of series connected resistors 55 and 56 connected in parallel with a pair of series connected condensers 57 and 58. A condenser 59 is connected between the junction of resistors 55 and 56 and ground while a resistor 60 is connected between the junction of condensers 57 and 58 and ground. One end terminal 61 of the network is connected to the grid 41 of tube 40 and the other end terminal 62 is connected to the output side of the coupling condenser 53. With components of proper values in this network 54 I have been able to successfully modify the square wave form of the modulator so that the signal appearing at junction 63 is substantially a pure sine wave.

This modified or treated alternating current error signal is then fed to the amplifier 52 of any conventional form that will develop sufficient power to operate the motor 64 and rotate the shaft 65 in accordance with the information contained in the amplified error signal. For instance the direction of rotation is determined by the phase of the signal, the angular movement by the amplitude and the rapidity of movement by the slope or rate of change of the voltage.

The shaft 65 performs at least two functions namely to transmit the error signal in terms of mechanical movement to apparatus to be controlled by the error signal and to produce a feedback voltage that is combined with the control voltage to produce the error signal as previously described.

To produce the feedback signal or bucking voltage, a potentiometer 66 may be used with its arm 67 mechanically coupled to the shaft 65 of the motor 64. The end terminals of the resistance element 68 are connected to a battery 69 having one terminal thereof grounded. The bucking or feedback voltage is then obtained from the movable contact arm and fed to the network 10 by the lead 21 as described earlier in the specification. The polarities of the bucking and control voltages are maintained alike and in operation the servo attempts to cause the bucking voltage to increase or decrease as the case may be to equal the control voltage and in so doing the desired rotation of the motor shaft 65 is obtained.

The vibrator or chopper 2 (Fig. 1) may be of any desired type such for example as a vibrating reed, a commutator or other interrupting means. In Fig. 3 I have illustrated one form of a vibrating reed chopper that will produce good results in the circuit shown in Fig. 2.

This chopper has a channel-shaped frame 70 having upwardly extending ears 72 adapted to be bent inwardly at the top as shown at 74 to clamp certain operative elements of the vibrator in position on the channel. On the base of the channel is a small rectangular permanent magnet 75 extending from the left end of frame 70 to about the midpoint thereof and enclosed by an inverted non-magnetic channel member 76. Spaced immediately above the magnet 75 and channel 76 by an insulating spacer 77 is a relatively rigid strip of metal 78. This strip carries a contact 79 on one end and has an outwardly extending part 80 on the other end for connection to an electric circuit.

Overlying the strip 78 is a rigid strip member 81 having an adjusting screw 82 adapted to bear on the strip 78 immediately above the contact 79 in order to vary the contact spacing. On top of the strip member 81 is a thin strip of insulating material 83 and a spacer 84. The insulating material 77, as may be seen in Fig. 4, extends upwardly along the side of members 78, 80, 81, 83 and 84 and its ends are folded inwardly at 85 to completely insulate those members from the frame 70. At the other end of the channel or frame 70 is a small metallic block 86 having a transverse slot 87 in the upper side thereof. The vibrating reed 88 extends at one end between the contact 79 and the inverted channel 76 and terminates at its other end in a downwardly depending flange 89 that cooperates with the slot 87 to hold the reed in alignment with the contact 79. The reed 88 is held in place by a thin metallic spring member 90 clamped to the block 86 and frame 70 by the bolt 91 and cooperating nut 92. As the reed 88 is grounded to the frame 70, the latter may be used for the second electrical connection to complete the chopping circuit.

Surrounding the entire vibrator assembly is an electromagnetic coil 93 having end terminals 94 and 95 for attachment to an alternating current source. This coil cooperates with the permanent magnet 74 to effect vibration of the reed 88 in the following manner. The reed 88 has a normal bias toward the contact 79 so that in the absence of any magnetic influence on the magnetizable reed the circuit through the vibrator will be closed. The presence of the magnet 74, however, pulls the reed 88 away from the contact 79 to open the vibrator circuit. Now upon energization of the coil 93 with an alternating current, the effect of the magnet 74 will be alternately neutralized and supplemented and this action will cause the reed to vibrate in synchronism with the frequency of the alternating current.

Although I have described only one form of vibrator or chopper for interrupting the error signal, it is understood that other electrical and mechanical devices well known in the art can be used satisfactorily with my invention.

As is apparent from the foregoing description of my invention, I have successfully overcome the serious problems of drift, introduction of spurious harmonics, non-uniformity of units, etc., that are encountered with prior modulators known to me. I have in addition obtained uniformity in modulator operation without the need for balancing controls or other adjusting means and can accomplish this in large quantity production, thus materially reducing the cost of the units and at the same time retain the highly important advantage of complete interchangeability of any one unit with any other.

I claim:

1. A servo of the character described comprising an amplifier for amplifying an alternating current error signal, means responsive to the output of the amplifier to produce a direct current feedback signal proportional thereto, a direct current control signal, an integrating and differentiating electrical network operable to produce a direct current error signal proportional to the difference between said control and feed-back signals, mechanical means for periodically interrupting said error signal, and means for feeding said interrupted error signal to the input of the amplifier.

2. A modulator responsive to at least two direct current signals to produce a third alternating current signal equal in magnitude to one of the direct current signals plus the algebraic difference between the two signals, comprising a differentiating and integrating resistance and capacitance network coupling said signals to produce an output signal and a single pole single throw electro-mechanical vibrator for sampling one of said direct current signals when open and the algebraic difference between the signals when closed to produce said third signal.

3. A servo of the character described comprising an alternating current amplifier, electromechanical means coupled to said amplifier and responsive to the output thereof, said means including a rotatable shaft, means responsive to changes in angular position of said shaft for generating a direct current feedback signal, a direct current control signal, means for mixing said feedback and control signals to produce an error signal, and means comprising an electromechanical vibrator for alternately impressing upon said amplifier one of said first mentioned signals and then said error signal.

4. The servo according to claim 3 wherein said vibrator includes a single pair of contacts which are alternately opened and closed, one of said contacts being connected to said amplifier for impressing thereon, when said contacts are open, a voltage varying with said feedback signal and for impressing on the amplifier said error signal when said contacts are closed.

References Cited in the file of this patent

UNITED STATES PATENTS

| Number | Name | Date |
|---|---|---|
| 2,150,006 | Parker et al. | Mar. 7, 1939 |
| 2,203,689 | Macdonald | June 11, 1940 |
| 2,316,240 | Harrison | Apr. 13, 1943 |
| 2,367,746 | Williams, Jr. | Jan. 23, 1945 |
| 2,423,540 | Wills | July 8, 1947 |
| 2,590,528 | Gilbert | Mar. 25, 1952 |

OTHER REFERENCES

"Theory of Servo Systems," Institution of Electrical Engineers, Journal, vol. 93, No. 34, part II, August 1946, pp. 353–372.